US006681041B1

(12) United States Patent
Stokes et al.

(10) Patent No.: US 6,681,041 B1
(45) Date of Patent: Jan. 20, 2004

(54) SYSTEM AND METHOD FOR CONVERTING COLOR DATA

(75) Inventors: Michael D. Stokes, Redmond, WA (US); Adrian Secchia, Bellevue, WA (US); Gilman Wong, Redmond, WA (US); Hock San Lee, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/556,672

(22) Filed: Apr. 24, 2000

(51) Int. Cl.[7] ................................................. G06K 9/34
(52) U.S. Cl. ...................... 382/164; 382/165; 382/167; 382/282; 382/284; 358/515; 358/516; 358/518; 345/590; 345/597; 345/600; 345/604
(58) Field of Search ............................... 382/162, 190, 382/163, 194, 164, 217, 165, 218, 167, 224, 169, 277, 170, 278, 171, 286, 219, 220, 274, 275, 282; 345/589, 590, 591, 593, 597, 600, 601, 603, 604; 348/453, 454; 358/512, 515, 516, 518, 519, 520, 521, 538

(56) References Cited

U.S. PATENT DOCUMENTS

| | | | | |
|---|---|---|---|---|
| 5,303,071 A | * | 4/1994 | Kakumura | 358/519 |
| 5,710,871 A | * | 1/1998 | Tadenuma et al. | 395/109 |
| 5,719,689 A | * | 2/1998 | Terada | 358/529 |
| 5,930,387 A | * | 7/1999 | Chan et al. | 382/166 |
| 6,101,271 A | * | 8/2000 | Takahashi | 382/167 |
| 6,181,444 B1 | * | 1/2001 | Aato | 358/519 |

OTHER PUBLICATIONS

"Multimedia Systems and Equipment Colour Measurement and Management", International Electrotechnical Commission, 61966–2–2 IEC.

"Colour Management in Multimedia Systems", International Electrotechnical Commission, 61966–2–1 IEC: May 28, 1998.

"Specification ICC.1: 1998–09 File Format for Color Profiles", International Color Consortium, 1994–1998.

* cited by examiner

*Primary Examiner*—Bhavesh M. Mehta
*Assistant Examiner*—Yosef Kassa
(74) *Attorney, Agent, or Firm*—Leydig, Voit & Mayer, Ltd.

(57) ABSTRACT

A system and method converts input color data in different formats into a working color space. In the case that the input data includes a device color profile and the desired working color space is an RGB space, gamma information of the input data may be extracted from the color profile. In a Simplified extraction process, the gamma information may be extracted by combining one-dimensional LUTs in the profile in a gray-scale conversion to form a gamma table. When the color profile is a more complex profile, such as one of the regular ICC profile format, a full extraction process may be used, in which gamma information is derived from each of the front end, middle and back end portions of the profile. The derived gamma information may then be combined to provide a final gamma table.

15 Claims, 6 Drawing Sheets and its advantages, will be best understood from the following detailed description of illustrative embodiments taken in conjunction with the accompanying drawings, of which:

SYSTEM AND METHOD FOR CONVERTING COLOR DATA

TECHNICAL FIELD OF THE INVENTION

This invention relates generally to computer graphics applications, and more particularly to the use of computers for performing various digital color processing operations.

BACKGROUND OF THE INVENTION

The proper representation of a color image is a very complex and often difficult subject matter. Historically, various color processing and reproduction techniques have been developed and used in several somewhat related but largely independent industries, such as movie filming, television, photography, and printing. Each of the different industries deals with a different set of constraints and conditions relating to the physical devices or media used to capture or reproduce the color images, such as a TV camera, a color film, or a color printer. As a result, many different color spaces have been developed to model and describe the colors of images in different applications. Several of the color spaces are defined by widely accepted industrial standards, such as the CIEXYZ and CIELAB color spaces by the Commission Internationale de l'Eclairage (CIE). Many other color spaces, however, are ad hoc and/or proprietary models used by different companies and sometimes specific to a given product, such as a digital camera or a printer.

In response to the current chaotic situation in digital color representation caused by the existence of many color description schemes that are often incompatible, the International Color Consortium ("ICC") was established with the goal of providing an open, vendor-neutral, cross-platform color management system architecture. One of the main efforts of ICC is to provide a universal approach to enable a clear definition of all the variables involved in the handling of colors by a device. This approach is based on a working concept called a "profile connection space," wherein each device has a "color profile" that describes the color management parameters used by the device. The format of the color profiles is described in the ICC Specification ICC.1:1998-09. Such device profiles can be used to translate color data created or processed on one device into the native color space of another device. By embedding device profiles in color image data and performing color translations based on the profiles, color data can be transparently moved across devices and operating systems.

The use of device color profiles provides an effective means for tracking and ensuring that a color is correctly mapped from the input color space to the output color space. There is, however, a broad range of users who do not require the level of flexibility, quality and control offered by the ICC profile-based color management strategy. Many developers also find it difficult to provide support for the full ICC profile format. For instance, the processing power required to use the ICC profiles might not be readily available for certain portable devices such as digital cameras. There are also some "legacy" platforms for which it may be difficult or costly to port ICC support.

To address these concerns, two color spaces, sRGB and sRGB64, have been proposed for use as standard default color spaces to compliment the ICC color management strategy. The sRGB space is a perceptual-based color space that is aimed at providing good color image quality with minimum transmission and system overhead. The sRGB64 color space is a physical-based color space that is closely related to the sRGB space and is intended for more advanced users who require more processing quality than that available with the sRGB space.

At the same time, there are efforts to develop alternative color management schemes for profile-based color translation that use significantly simplified profile formats to reduce the amount of processing involved. For instance, the proposed ICC standard has provisions for a simplified version of the ICC profile format. Another proposed scheme uses what is called a "Simple ICC JPEG2000 Tag," which has a format very similar to the simplified profile format of the ICC standard but with the data interpreted somewhat differently.

Even with the above-described proposed color management strategies intended to provide uniformity and compatibility in the representation of colors, cross-platform color data transfer is still far from being a simple matter. One issue facing developers of graphics software is how to properly handle the different input and output color data formats. For instance, on a platform that uses the SRGB color space and has no support for the ICC strategy, there is a need for a solution to properly convert input color data with embedded device profiles for color processing operations or to convert processed data for output to an output device without suffering undue degradation of visual image quality. One specific question in that context is how to extract information regarding the gamma values for the color spaces used by the input and output color devices, since such information is not explicitly provided in the device color profile.

SUMMARY OF THE INVENTION

In view of the foregoing, the present invention provides a system and method for processing color data for input and output, including converting input color data in various formats into a working color space, and converting processed color data into the color space of an output device. In the case that the input data includes a device profile and the desired working color space is an RGB space, gamma information of the input data is extracted from the profile. In a simplified extraction process, the gamma value may be extracted by combining one-dimensional LUTs in the profile in a gray-scale conversion to form a gray-scale representation. This simplified extraction process can be effectively used not only on a simplified profile, such as one of the simplified profile format of the proposed ICC standard or the format of the Simple ICC JPEG2000 Tag, but also on more complex profile formats such as the full profile format of the proposed ICC standard. A full extraction process is also provided to more fully utilize the conversion data in a more complex profile, such as one of the full profile format of the proposed ICC standard. In the full extraction process, gamma information may be derived from each of the front end, middle, and back end portions of the profile. The derived gamma information for the portions of the profile may then be combined to provide a final gamma table or value. The robustness of the gamma extraction may be improved by testing the monotonicity and continuity of the 1-D LUTs from which the gamma table is derived.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
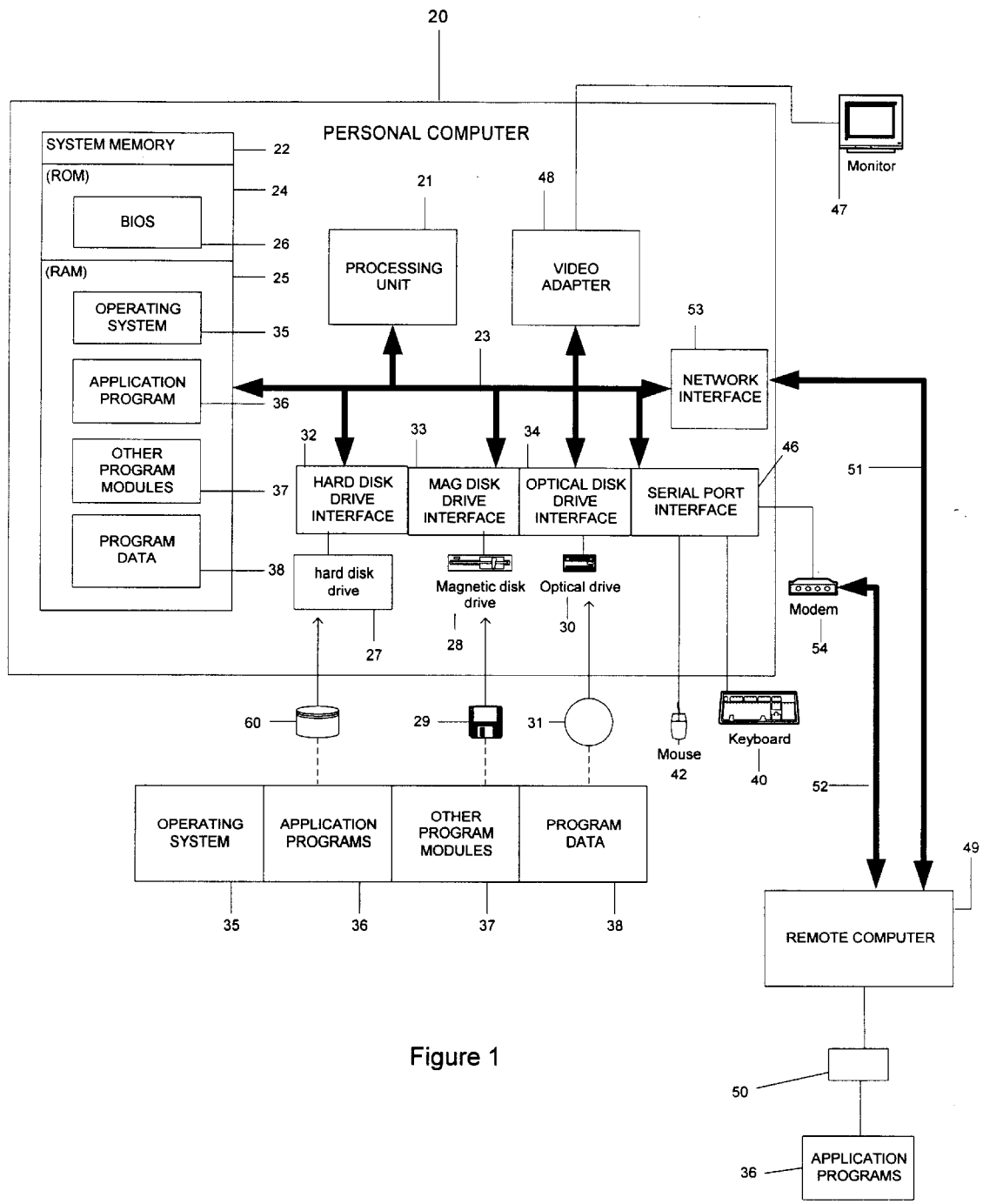
FIG. 1 is a block diagram generally illustrating an exemplary computer system on which the present invention may reside.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
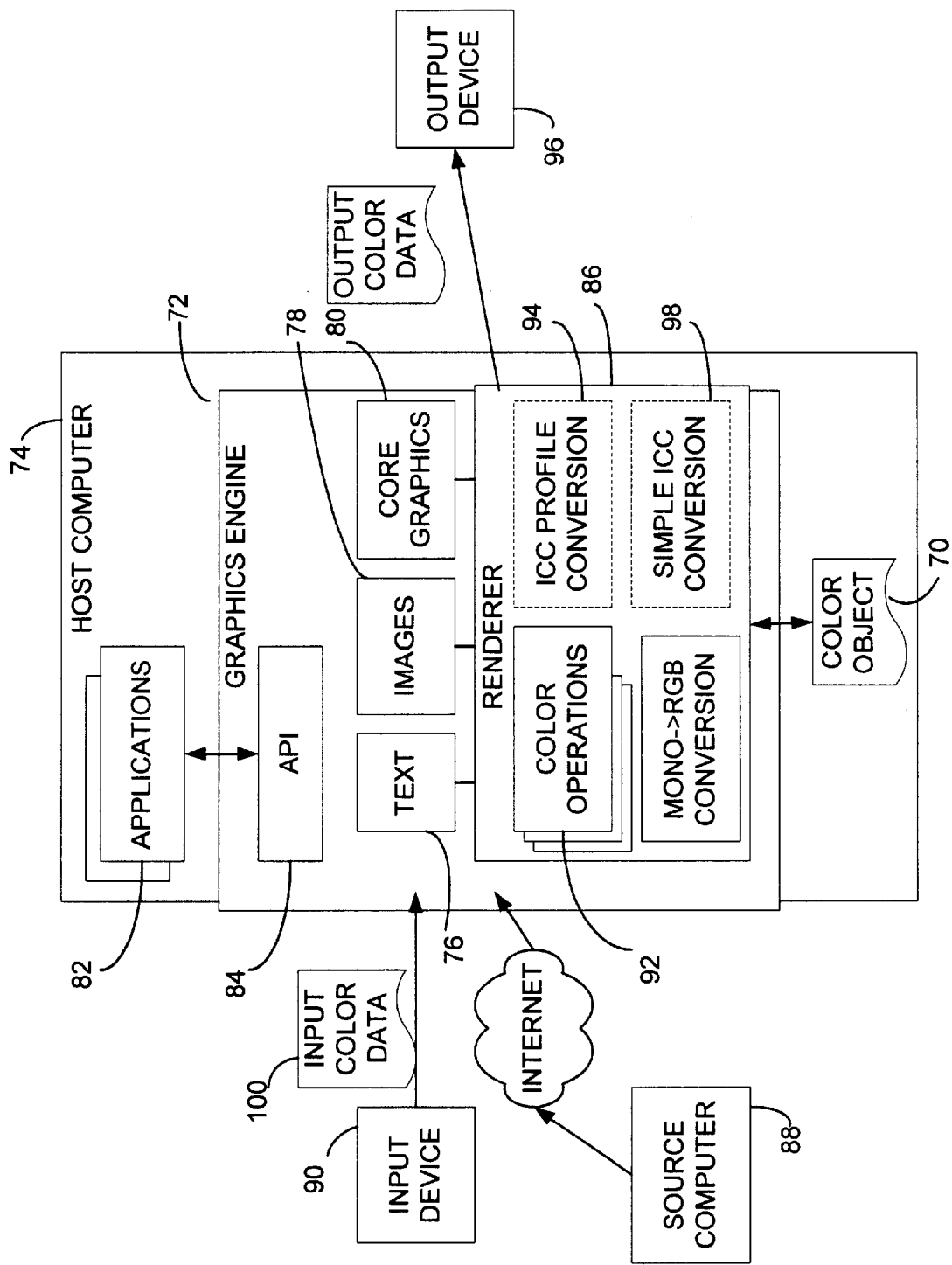
FIG. 2 is a schematic diagram showing an embodiment of a computer graphics processing system that has a graphics engine for converting input color data of different color representations and for extracting gamma information from a device profile in accordance with the invention.

Referring now to FIG. 2, the present invention is directed to a method and system for a computer graphics processing system to effectively handle input and output color data of different formats. Moreover, when necessary, the system extracts gamma information for the color space of an input or output device from a color profile associated with the device. The extracted gamma information may then be used for converting input color data to a working color space for processing, and/or converting processed color data for output to the output device.

In the illustrated embodiment of FIG. 2, the color processing system includes a graphics engine 72 responsible for controlling and performing various computer graphics and color operations. The graphics engine 72 may be part of an operating system of the host computer 74 that is usable by various applications 82. For example, the graphics engine may be part of the Graphics Device Interface Plus (GDI+) library of the Windows 2000 Operating System by Microsoft Corporation. Alternatively, the graphics engine 72 may be part of a separate computer software application, such as one of the various software products for editing and printing photographic pictures captured by digital cameras.

In the illustrated embodiment, the graphics engine 72 includes a component 76 for handling text objects, a component 78 for handling image objects, and another component 80 for handling computer graphics objects generated by digital painting, modeling, or drawing programs. The data of each of these object types are rendered by a renderer 86 into an image format suitable for visual representation, such as displaying or printing, by an output device 96. The graphics engine 72 includes, among other things, modules 92 for performing various color processing operations. To allow the color processing modules to be used by other applications or modules, the graphics engine provides application programming interfaces (APIs) 84 through which the color processing modules may be invoked. In accordance with an aspect of the embodiment, the graphics engine may further include a component 94 for performing color translation based on color profiles in the ICC profile format, and/or a component 98 for handling color translation based on color profiles in a simplified profile format, such as that of the Simple ICC JPEG2000 Tag.

The color data on which various color processing operations may be performed is contained in an object such as the color object 70. The graphics color data 100 from which the color object 70 is created may be generated on the computer 74 on which the graphics engine 72 resides. For instance, the color data 100 may represent text, images or graphic elements created by a user using graphics applications. Alternatively, the input color data 100 may be imported from another computer. For example, the color data may be downloaded by the host computer 74 over the Internet from another computer 88 as part of the contents of a Web page. In another scenario, the color data 100 may be originally generated by an input device 90. The input device 90 may be, for example, a digital camera, a scanner, a digital video recorder, etc. The processed color object may be used for output to an output device 96 for presenting the graphics data in a form viewable by the user. In a preferred embodiment, the graphics engine 72 supports at least the sRGB color space as the working color space. The sRGB color space is defined in a proposed standard IEC 61966-2-1, which is hereby incorporated by reference.

Because of the various color spaces currently being used by different device manufacturers, the color spaces of the input and output color devices may be different from the internal working color space of the graphics engine. In that case, a conversion of the input color data into the working color space has to be properly performed to avoid degradation of the visible quality of the color image. The processed color data may then have to be properly converted into the color space supported by the output device.

Figure 3:
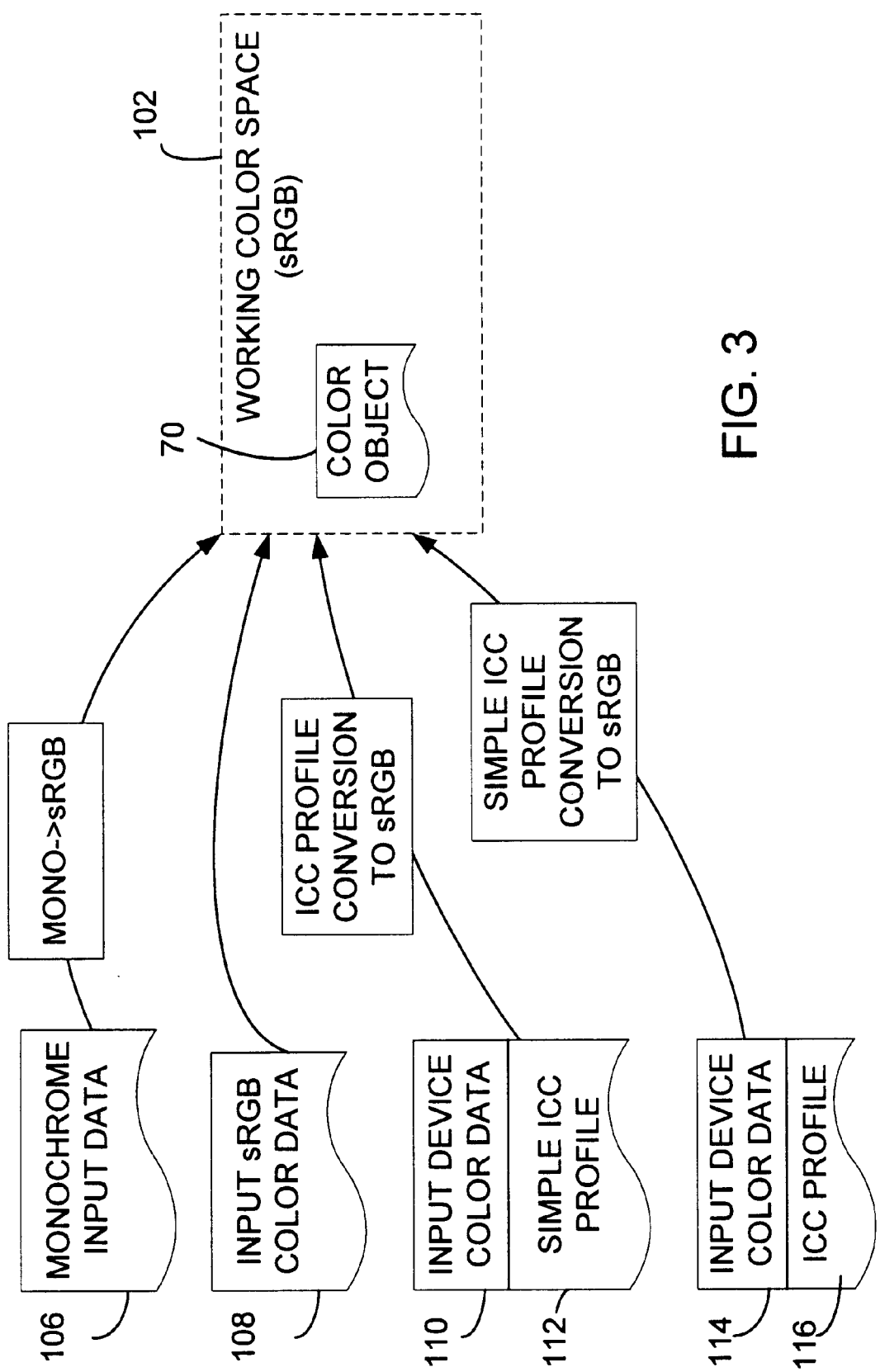
FIG. 3 is a schematic diagram showing conversions of input color data of different input formats into a working color space of the graphics engine.

In accordance with an aspect of the invention, a method is provided to adequately convert the input color data 100 from the original color format of the input data into a working color space 102 of the graphics engine. In a preferred embodiment, as shown in FIG. 3, it is assumed that the input color data may be of one of at least the following types: monochrome (i.e., grayscale) data, data in the sRGB space, data in a device color space with an ICC device profile attached thereto, and data in a device color space with a color profile of a simplified format, such as that of the Simplified ICC JPEG2000 Tag, attached thereto.

Figure 4:
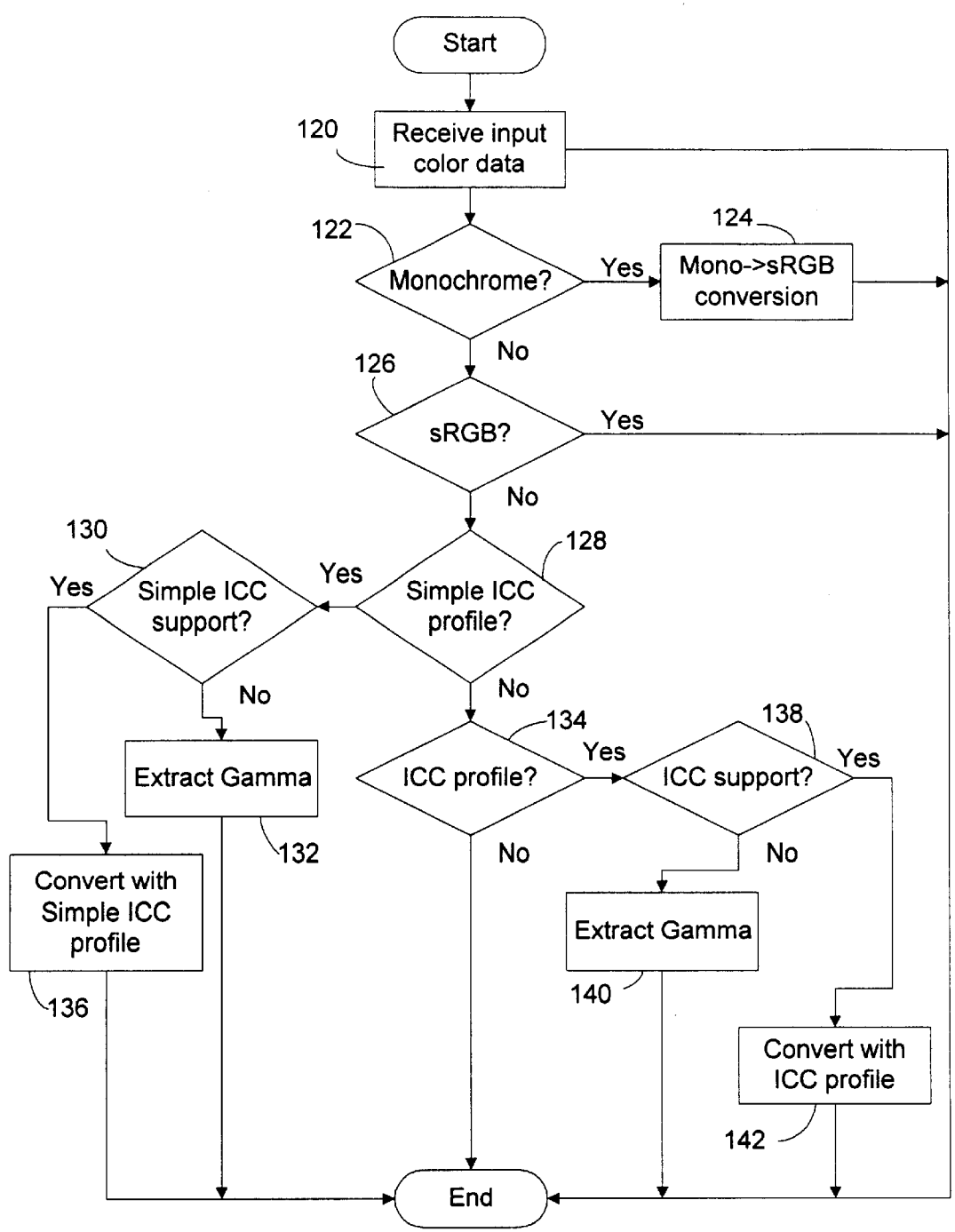
FIG. 4 is a flow chart showing a process for converting input color data of different color representations.

Referring now also to FIG. 4, when the graphics engine 72 receives the input color data (step 120) from a source, which may be an input device 90, another computer 88, or an application 82 on the host computer 74, it determines the original color space of the input data. If the input data represents a monochrome image (step 122), the monochrome input data 106 are converted into the sRGB space 102 using a monochrome-to-color conversion technique (step 124), such as one based on the well-known conversion standard ITU-R BT.709. If, however, the input color data are already in the sRGB format (step 126), then no additional conversion has to be performed on the input color data 108.

If it is determined (step 128) that the color data 110 have embedded therein a simplified color profile 112, such as one of the Simple ICC JPEG2000 Tag format, and the graphics engine does not support color conversion based on such simplified profiles (step 130), then a gamma table or gamma value of the input color data may be extracted from the profile (step 132), as will be described in greater detail below. The extracted gamma information may be used for processing the color data in a recoloring process before outputting the data to an output device. If, however, the graphics engine does support the simplified profile-based conversion, the simplified profile component 98 may be invoked to convert the input color data 110 into the sRGB working color space 102 (step 136). The conversion process uses the simplified profile 112 of the input data together with the simplified profile for the sRGB space to convert the input data into the sRGB space.

Similarly, if the color data 114 have a color profile 116 of the regular ICC profile format embedded therein (step 134) and the graphics engine does not support the ICC profile-based conversion (step 138), then a gamma table or gamma value of the input color data may be extracted (step 140) from the profile, as will be described in greater detail below. If, on the other hand, the graphics engine supports the ICC profile-based conversion, the ICC component 94 may be invoked to convert the input color data 114 into the sRGB working color space (step 142).

In accordance with one aspect of the invention, when the input color data has a color profile (e.g., an ICC profile or a Simple ICC profile) attached thereto, the gamma value of the input color data can be extracted from the data in the profile. Similarly, when the output device has a color profile, the gamma value used by the output device may be extracted from that profile for purposes of output conversion of color data. In accordance with the invention, either a simplified extraction process or a full extraction process may be performed, depending on the desired quality of conversion and the complexity of the profile. Specifically, the simplified extraction process is suitable for profiles of a simplified format, such as that of the proposed ICC standard or that of the Simple ICC JPEG2000 Tag. Moreover, the simplified extraction process is equally applicable to profiles of a more complex format, such as the full profile format of the proposed ICC standard, when the benefit of smaller and faster processing is important. The full extraction process, on the other hand, more fully utilizes the data in a full color profile to provide a potentially more accurate estimation of the gamma values. Because the technique used to extract gamma in the simplified extraction process is also part of the full extraction process, the simplified extraction process is described first.

Figure 5:
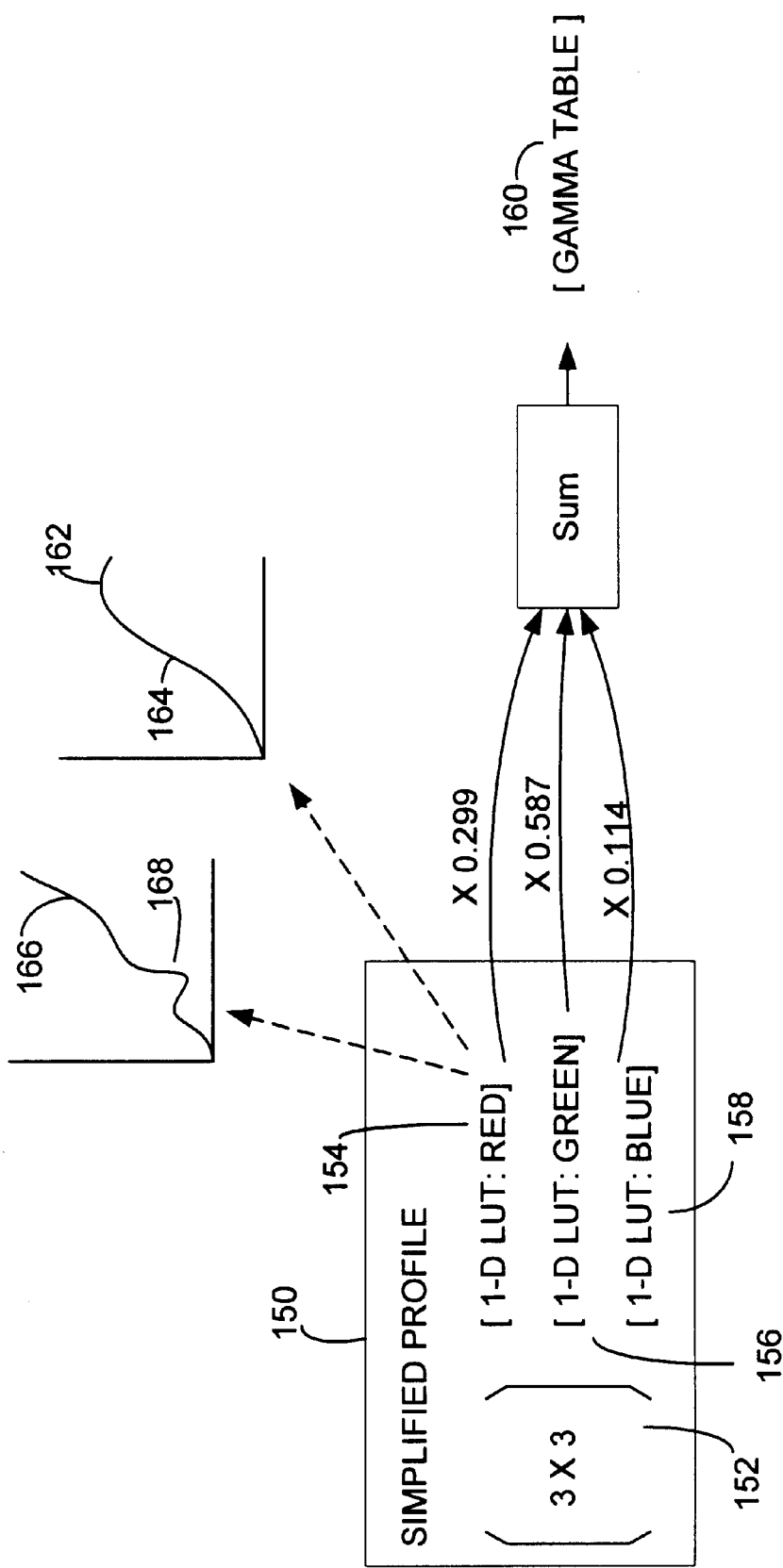
FIG. 5 is a schematic diagram showing a simplified process for extracting gamma data from a color profile.

Referring now to FIG. 5, for illustration purposes, the profile from which the gamma data are to be extracted is shown to be a simplified profile 150, which includes a three-by-three (3×3) matrix 152 and three one-dimensional (1-D) look-up tables (LUTs) 154, 156, and 158 that correspond to the red, green, and blue color components, respectively. As mentioned above, this simplified profile may be, for example, a Simple ICC JPEG2000 Tag or a profile of the simplified ICC profile format. It will be appreciated, however, that this data structure is also found in the front end portion of the full ICC profile format, as will be described in greater detail below in connection with FIG. 6. Thus, the simplified gamma extraction process may also be applied to a full color profile by using only the data in the front end portion of the profile.

In accordance with the invention, the gamma data are extracted by obtaining a gray-scale representation of the LUTs by combining them according to a color-to-gray conversion. In the illustrated embodiment, the conversion is based on the NTSC/ITU-R BT.601/5 conversion function. Specifically, the red, green, and blue tables are multiplied with the coefficients 0.299, 0.587, and 0.114, respectively. The three multiplied tables are then added together to form a table 160 that is a reasonable estimation of the gamma curve of the input data from which a gamma value may be computed and used in subsequent color operations.

The robustness of this gamma extraction method can be improved by testing the 1-D tables 154, 156, and 158 in the profile 150 for monotonicity and continuity before they are combined to form the gamma table 160. If the tables are monotonic and continuous, the resultant gamma table is likely to be a fair estimation of the gamma of the color input data. On the other hand, if one of the 1-D LUTs is not monotonic, it may be examined to see if there is a simple "hump", such as the hump 162 in the exemplary curve 164. The existence of such a hump indicates that the ink has limits after which the optical density decreases as the ink concentration increases. A 1-D LUT of this shape may still be usable in estimating the gamma table using the technique described above, although the resultant table may be reliable only up or close to the point where the slope of the curve reaches 0.

On the other hand, a non-monotonic 1-D LUT may have a "dip", as illustrated in the exemplary curve 166. Such a dip 168 is often due to measurement errors, and may be smoothed by preprocessing the curve to remove such dips. One way to accomplish this is, for example, to connect the inflection points of the curve. The modified LUT may then be used in the gamma extraction method described above.

In the case that one of the 1-D LUTs is discontinuous, it can be examined to determine whether there is a single "jump" in the curve, which is typically caused by errors in dot-gain measurements. If such a jump exists, the small part of the curve prior to the discontinuity may be ignored, and the gamma value can be estimated using the remaining curve.

Figure 6:
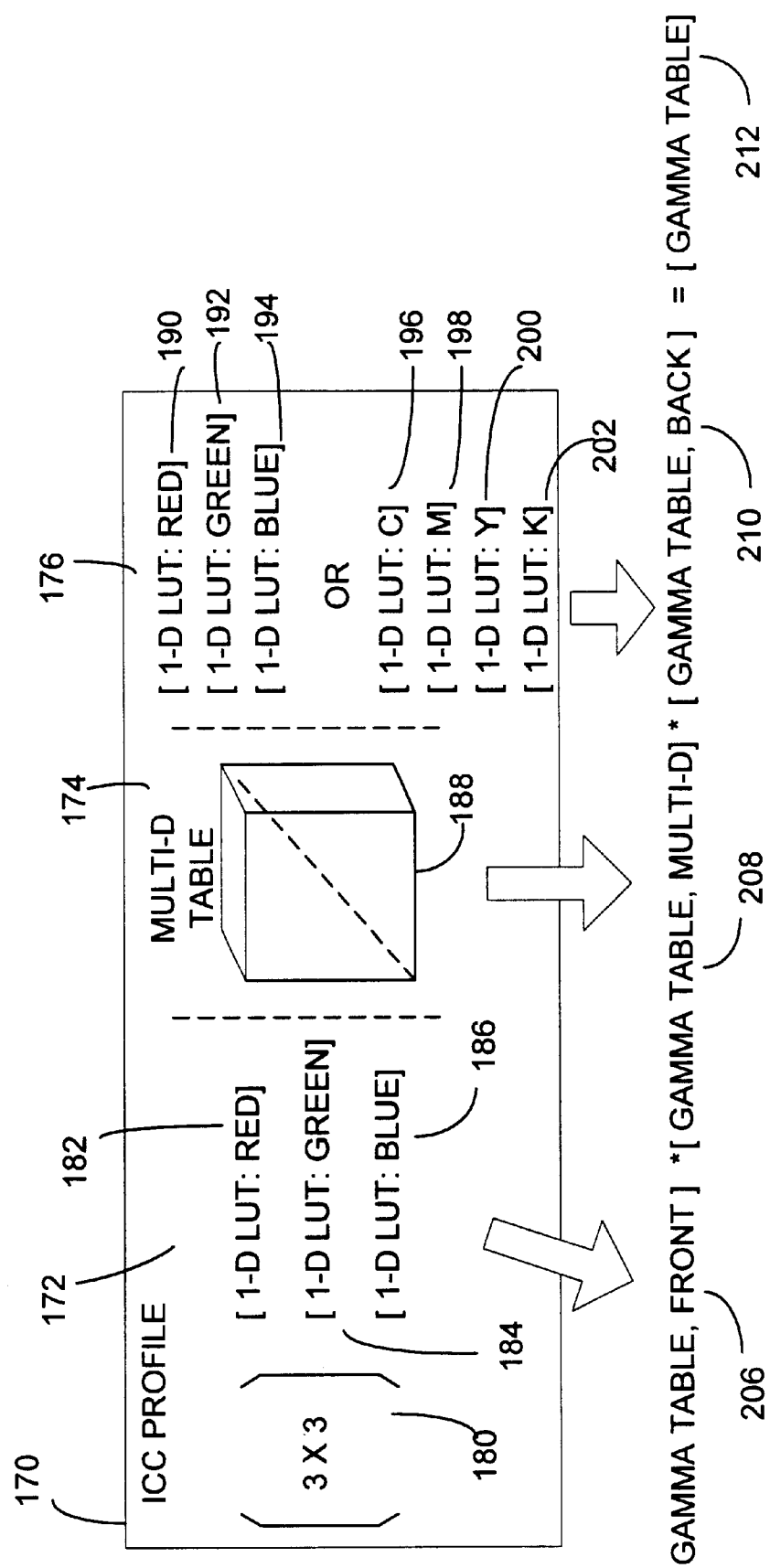
FIG. 6 is a schematic diagram showing a full extraction process for extracting the gamma data from a more complex color profile.

Turning now to the full extraction process, FIG. 6 shows a typical structure of a regular ICC profile 170. The profile 170 includes a front end portion 172, a middle portion 174, and a back end portion 176. The front end portion 172, like the simplified profile 150, contains a 3×3 matrix 180 and three 1-D LUTs 182, 184, and 186. The back end portion of the profile usually has either three 1-D LUTs 190, 192, and 194 for red, green, and blue, or four 1-D LUTS 196, 198, 200, 202 for cyan, magenta, yellow, and black (CMYK).

The middle portion 174 of the profile is a multiple-dimensional look-up table 188 that can be visualized as a 3-D lattice structure. The input RGB values determine where in the 3-D lattice to find the appropriate vertex for output values. Each vertex in the 3-D lattice structure contains an output value. If the output is RGB, then the vertex output value contains three sub-values, one for the red output, one for the yellow output, and one for the black output. By looking up the input value, one can obtain the appropriate output value either by directly finding a vertex match or by interpreting between the nearest vertices.

In a preferred embodiment, a gamma table can be derived from each of the front end, middle, and back end portions of the ICC profile 170. The gamma extraction for the front end 172 is the same as that for the simplified color profile as described above. If the color profile is for an RGB space, the three LUTs 190, 192, 194 in the back end portion 176 may be used for gamma extraction in the same way the gamma of the front end 172 is estimated. If the profile 170 is for a CMYK color space, the gamma information for the back end portion may be extracted by directly using the black table 202. Alternatively, the four CMYK LUTs 196–202 may be first converted to three RGB LUTS by using an inversion of a common RGB-to-CMYK conversion. For example, the RGB-to-CMYK conversion may be based on the following relationship between the RGB and CMYK components:

K=min(R,G,B)

C=1-R-K

M=1-G-K

Y=1-B-K

As to the middle portion 174 of the ICC profile 170, two methods may be used to extract the gamma information from the multi-dimensional table 188. The first one is to simply take the output values of the diagonal vertices of the table 188 to form the gamma table 210. The diagonal vertices correspond to input values that have equal amounts of red, green, and blue in the input color. The second method is to take a set of uniformly distributed gray-scale values as input, and obtain the corresponding output values. By way of example, the set of input gray-scale values may be (0, 16, 32, . . . , 256). The output values obtained from the table 188, which may be either RGB or CMYK values, can then be treated as three or four 1-D tables, from which a gamma table 210 may be calculated in the same way for extracting gamma for the back end portion of the profile.

With the gamma extraction for each of the front end, multi-dimensional table, and back end of the profile as described above, three gamma tables 206, 208, 210 are generated. The three gamma tables can be combined, such as by being multiplicatively applied in sequence to each other, to form a final gamma table 212. This gamma table may then be used for a subsequent recoloring process on the color data.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed is:

1. A computer-readable medium having computer-executable instructions for performing steps for extracting gamma information from a color profile, comprising:
   reading the color profile, the color profile including three one-dimensional tables for red, green, and blue color components, respectively;
   multiplying the one-dimensional tables for red, green, and blue color components with respective coefficients for a color-to-gray scale conversion; and
   summing the multiplied one-dimensional tables to form a gamma table.

2. A computer-readable medium as in claim 1, wherein the color profile is of a simplified profile format.

3. A computer-readable medium as in claim 1, having further computer-executable instructions for performing the steps of:
   testing data in the one-dimensional tables for continuity and monotonicity; and
   selectively modifying the data in the one-dimensional tables to remove irregularities.

4. A computer-readable medium having computer-executable instructions for performing steps for extracting gamma information from a color profile, comprising:
   reading the color, the color profile having a front end portion including multiple one-dimensional tables, a middle portion including multi-dimensional table, and a back end portion including multiple one-dimensional tables;
   deriving a first gamma table from the one-dimensional tables of the front end portion;
   deriving a second gamma table from the multi-dimensional table;
   deriving a third gamma table from the one-dimensional tables of the back end portion; and
   combining the first, second, and third gamma tables to form a final gamma table.

5. A computer-readable medium as in claim 4, wherein the color profile is an ICC profile.

6. A computer-readable medium as in claim 4, wherein the front end portion of the color profile includes three one-dimensional tables corresponding to red, green and blue color components, respectively, and the step of deriving the first gamma table includes multiplying the one-dimensional tables for red, green, and blue color components with respective coefficients for a color-to-gray scale conversion and summing the multiplied one-dimensional tables to form the first gamma table.

7. A computer-readable medium as in claim 4, wherein the step of deriving the second gamma table includes obtaining output values of diagonal vertices of the multi-dimensional table and constructing the second gamma table with said output values.

8. A computer-readable medium as in claim 4, wherein the step of deriving the second gamma table includes:
   providing an array of distributed gray scale values as input for the multi-dimensional table;
   obtaining output values from the multi-dimensional table corresponding to the array of gray scale values; and
   deriving the second gamma table from said output values.

9. A computer-readable medium as in claim 4, wherein the back end portion of the color profile includes three one-dimensional tables corresponding to red, green, and blue color components, and the step of deriving the third gamma table includes multiplying said one-dimensional tables for red, green, and blue color components with respective coefficients for a color-to-gray scale conversion and summing the multiplied one-dimensional tables to form the third gamma table.

10. A computer-readable medium as in claim 4, wherein the back end portion of the color profile includes four one-dimensional tables corresponding to cyan, magenta, yellow and black color components, respectively, and the step of deriving the third gamma table takes the one-dimensional table corresponding to the black component as the third gamma table.

11. A computer-readable medium as in claim 4, wherein the back end portion of the color profile includes four one-dimensional tables corresponding to cyan, magenta, yellow and black color components, respectively, and the step of deriving the third gamma table includes converting the one-dimensional tables corresponding to cyan, magenta, yellow and black color components into one-dimensional tables corresponding to red, green, and blue components, and combining the one-dimensional tables corresponding to red, green, and blue components to form the third gamma table.

12. A computer-readable medium having computer-executable instructions for performing steps for processing input color data, comprising:
   determining a format of the input color data;
   if the input color data is a monochrome image, performing a gray-to-color conversion to convert the input color data into a working color space;
   if the input color data has a color profile associated therewith and support for color conversion based on the color profile is present, converting the input color data based on the color profile into the working color space; and
   if the input color data has a color profile associated therewith and no support for color conversion based on the color profile is present, extracting gamma information for the input color data from the color profile.

13. A computer-readable medium as in claim 12, wherein the working color space is the sRGB color space.

14. A computer-readable medium as in claim 12, wherein the color profile is an ICC profile.

15. A computer-readable medium as in claim 12, wherein the color profile is of a simplified profile format.

* * * * *